Figure 1:
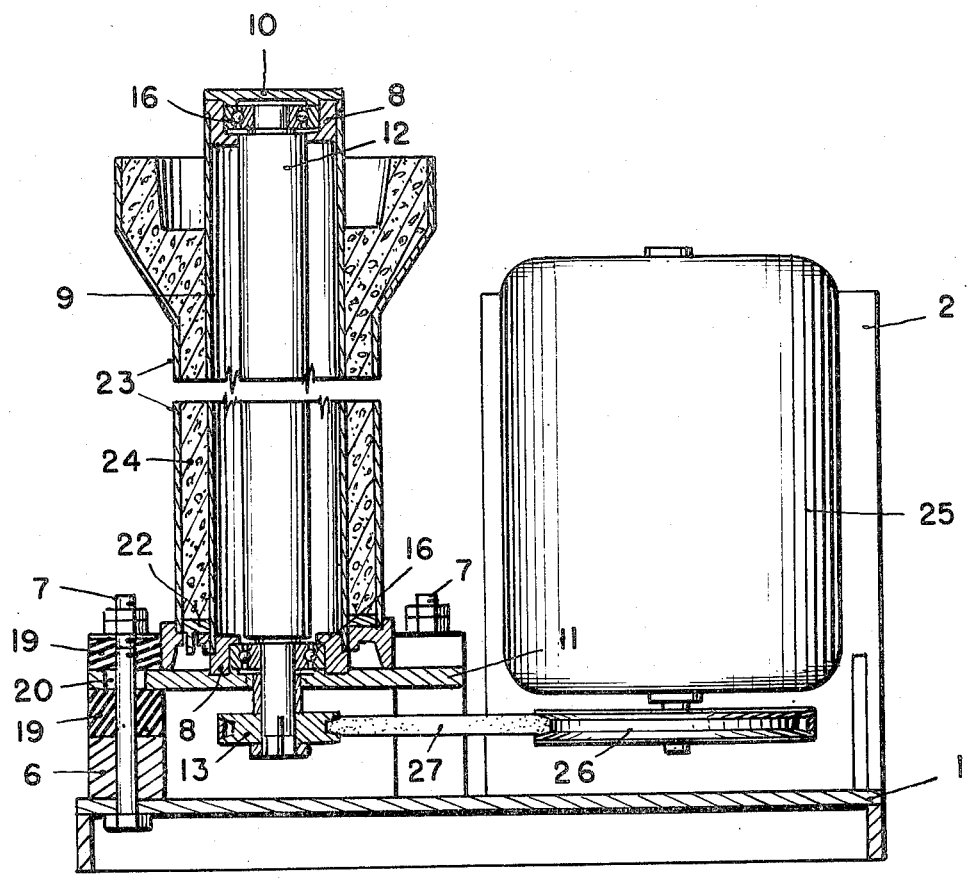

Oct. 3, 1950        O. NIELSEN        2,524,676
MACHINE FOR MOLDING HOLLOW CONCRETE PRODUCTS
Filed March 3, 1948        2 Sheets-Sheet 1

Inventor:
OLAV NIELSEN,

By    *E. F. Wenderoth*

Attorneys

Inventor:
OLAV NIELSEN,
By E. F. Wenderoth
Attorneys

Patented Oct. 3, 1950

2,524,676

UNITED STATES PATENT OFFICE 2,524,676

MACHINE FOR MOLDING HOLLOW CONCRETE PRODUCTS

Olav Nielsen, Brønderslev, Denmark, assignor to Pedershaab Maskinfabrik Aktieselskab, Brønderslev, Denmark Application March 3, 1948, Serial No. 46,486
In Denmark April 2, 1947

3 Claims. (Cl. 25—30)

In the casting of pipes, hollow building blocks, and similar hollow bodies of concrete or other mouldable masses it is known to use vibration for increasing the plasticity of the moulding mass and improving the finished castings. A vibrator has for example been clamped to the mould, or the whole mould has been placed on a vibrating table so that either the outer mould alone or the outer mould together with the core or cores was made to vibrate. There has also in the production of large pipes or other hollow bodies with very big cores been used a vibrator clamped on a transverse beam transversely to the core.

All these measures suffer, however, from various drawbacks which especially consist in the fact that it is not possible by means of a single vibrator or a vibrating table to cause a sufficiently uniform vibration throughout the whole of the moulding mass, so that the hollow bodies produced do not become so homogeneous, strong, and compact as it might be desired.

The purpose of the present invention is to remedy these drawbacks, and it consists first and foremost in that one or more of the cores incorporated in the mould are constructed as independent vibrators with an internally mounted, fast rotating or oscillating unbalanced mass.

By this arrangement a very intensive and uniform thorough vibration of the moulding mass is attained, such a core that is vibrating as a whole subjecting the moulding mass to a substantially uniform vibration along the full length of the core.

The casting machine proper may moreover be made stronger and more easily accessible, it being unnecessary on the outer mould to mount vibrators which together with their supply leads are in the way during the operation. The vibration requires less energy than in machines with vibrating table because the vibrating masses are smaller. The noise and wear are thereby reduced considerably.

Pipes and other hollow bodies are practically speaking always cast with the outer mould and core placed vertically. It will then be an advantage that the vibration occurs horizontally. By the arrangement in accordance with the invention it gets possible to perform the vibration in the form of horizontal movements of exactly the same amplitude in the full height of the vibrating core while all oblique movements or similar movements that are unnecessary for the vibration are avoided. This is in accordance with the invention attained by the centre of gravity of the eccentric mass being situated at about half the height of the vibrating core, it being a presupposition here that the core has a substantially cylindrical or prismatical shape, with a slight release in the drawing-out direction, if so desired.

The eccentric mass may in accordance with the invention consist of a side-heavy shaft known per se journalled in both ends of the core serving as vibrator. Hereby the vibration forces are transmitted to the very rigid core body at the ends of the latter or, if so desired, through intermediate supporting bearings disposed between the end bearings, whereby elastic deformations of the core may practically speaking be considered eliminated and exactly uniform vibration amplitudes be ensured along the surface of the whole of the core.

For the reduction of the masses participating in the vibration, the vibrating core or cores are in accordance with the invention mounted on a plate or a similar carrier which rests in rubber blocks or similar elastically yieldable supports. This arrangement also enables the whole of the vibration mechanism with pertaining bearings and driving means to be mounted so as to lie hidden and wholly or partly enclosed, whereby these parts are protected against abnormal wear. Such a carrying plate or corresponding support for the vibrating cores may in accordance with the invention advantageously be accommodated on a bracket that is movable vertically and which expediently furthermore carries the driving motor for the cores, so that the cores can be withdrawn from the mould by the whole aggregate being lowered or raised. This may be performed manually, mechanically, hydraulically, or pneumatically.

The release of the ready-vibrated hollow bodies may, however, also be performed by the outer mould together with the finished body being pulled upwards or downwards while the cores remain stationary, or the ready-cast body can be pushed up out of the mould cavity resting on a loose plate or ring which forms the bottom of the said cavity.

In spite of the intensive and uniform thorough vibration of the moulding mass attained by the invention, there is, especially in the case of high and slender objects, a certain inclination to occurrence of air pockets and a less satisfactory homogeneity in the upper end of the finished casting. This is due to the low pressure prevailing here which causes that even the energetic vibration has not fully the effect to be expected.

This drawback is in accordance with the invention remedied by a cover plate mounted at the top or a similar upper mould terminating member, e. g. a socket ring, being arranged for being kept loaded with a suitable pressure during the vibration. Hereby tolerably uniform pressure conditions can be maintained throughout the moulding mass so that the uniform vibration gets the possibility of producing the highest homogeneity.

Figure 2:
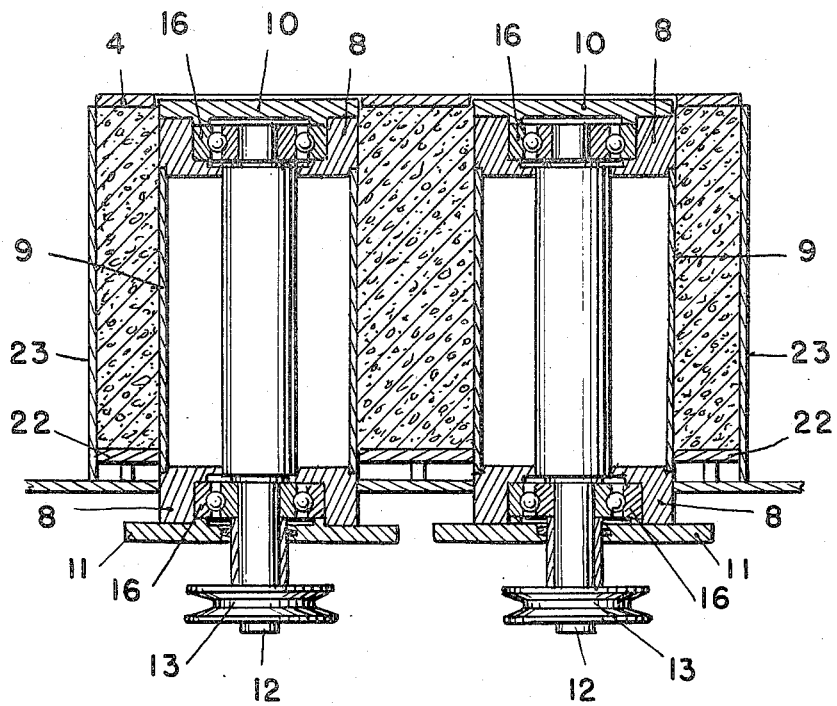
Figure 3:
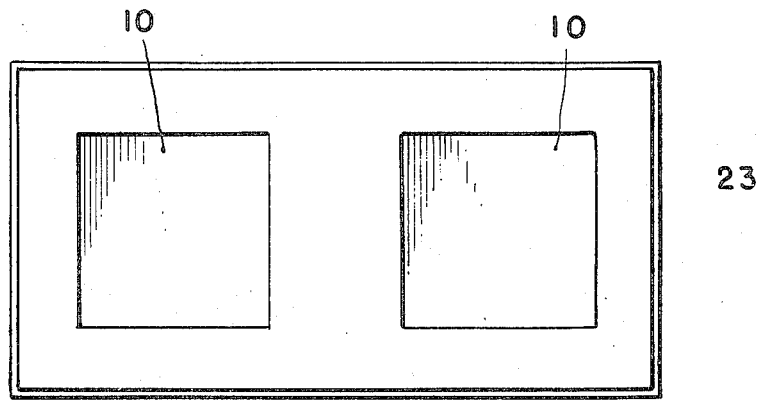

The invention is illustrated in the following with reference to the drawing on which:

Fig. 1 partly diagrammatically shows a longitudinal section through an embodiment of a pipe casting machine in accordance with the invention, Fig. 2 a longitudinal section through mould and cores for a hollow building-block casting machine, and Fig. 3 a plan view of Fig. 2.

On the drawing, 1 designates the table of the casting machine, on which table there is a vertically mounted motor base 2 with an electromotor 25. Besides this there are four supports 6 upon which a plate 11 is accommodated in rubber blocks 19 so as to be clamped by means of bolts 7 which pass through amply large holes 20 in the plate 11. In the centre of the plate 11, a core is secured consisting of two hubs 8 and a shell 9 welded thereto. Within the core a side-heavy shaft 12 is journalled in ball bearings 16, the upper one of which is covered with a top plate 10. The lower end of the side-heavy shaft 12 is carried down through the plate 11 and carries a V-belt pulley 13 which by means of a V-belt 27 is connected to the belt pulley 26 of the electro-motor.

In the example shown, the core is cylindrical and mounted concentrically in a usual outer mould 23 for the production of socket pipes 24 of concrete. Below, the outer mould rests on a ring 15 and has a loosely fitted bottom ring 22 on which the ready-cast pipe rests during withdrawal and hardening.

The socket end of the pipe is formed by a socket ring not shown which is put down around the core and closes the mould at the top, and this socket ring is arranged for being loaded with a certain pressure.

After the mould has been filled, the vibration is performed by the side-heavy shaft 12 being by the motor 25 put into fast rotation—up to 10,000 revolutions per minute. Hereby the core as a whole is given a vigorous vibratory motion which spreads to the moulding mass and makes the latter pack tightly and homogeneously together under the influence of the gravity and the pressure deriving from the load resting on the socket ring.

The withdrawal of the ready-cast pipe may as explained above be performed in any suitable way.

Figs. 2 and 3 show the invention applied in the production of rectangular hollow building blocks with two square cavities. Here there are two prismatical cores which correspond to the cavities and are composed of hubs 8 and shells 9 with internally journalled side-heavy shafts 12 running in bearings 16 and driven by V-belt pulleys 13. Also in this embodiment the moulding mass can be kept under pressure during the vibration, viz. by means of a plate 4 mounted at the top of the mould, which plate is loaded in a suitable way.

The vibration bodies of the cores can be driven in other ways than that shown, and the driving motor may be placed in closed connection to the cores or contingently within the latter. It may consist of an electrical, pneumatical, or hydraulical motor which drives a rotating or oscillating unbalanced mass in the vicinity of the centre of the core or several masses distributed over the length of the core. The essential feature is only that the core in itself forms a vibrator which in its full extent performs substantially uniform vibration movements.

I claim:

1. A machine for casting hollow bodies from plastic masses comprising a frame, a horizontal support resiliently mounted on said frame, a closed vertical core member fixedly mounted on said support, a stationary outer vertical form member enclosing and spaced apart from said core member, a vertical shaft situated within said core member and journalled for rotation at least in the ends of said core member, said shaft being weighted to place its center of gravity substantially at half the height of the core member and off-set laterally from the axis of rotation, and means for rapidly rotating said shaft.

2. A casting machine as claimed in claim 1 in which the upper end of the space between the core member and the outer form member is substantially closed by a closure member adapted to exert a continuous pressure on the plastic mass in said space during operation.

3. A casting machine as claimed in claim 1 in which the lower end of said shaft extends downwards through said support and is provided with driving means below the same.

OLAV NIELSEN.

REFERENCES CITED

The following references are of record in the file of this patent:

UNITED STATES PATENTS

| Number | Name | Date |
|---|---|---|
| 1,293,662 | Atterbury | Feb. 11, 1919 |
| 2,277,789 | Sink | Mar. 31, 1942 |
| 2,356,852 | Hutchinson | Aug. 29, 1944 |